United States Patent
Smith

[11] 3,813,667
[45] May 28, 1974

[54] THREE-PHASE POWER DISTURBANCE MONITOR

[75] Inventor: Maurice N. Smith, Oxnard, Calif.

[73] Assignee: The United States of America as represented by the Secretary of the Navy, Washington, D.C.

[22] Filed: May 29, 1973

[21] Appl. No.: 364,844

[52] U.S. Cl. ............ 340/248 A, 317/31, 340/248 B, 340/248 C, 340/248 P
[51] Int. Cl. .......................................... G08b 19/00
[58] Field of Search ............. 340/248; 317/253, 31; 328/148

[56] References Cited
UNITED STATES PATENTS

| | | |
|---|---|---|
| 2,756,409 | 7/1956 | Lubkin .......................... 340/248 A |
| 3,076,100 | 1/1963 | Cowlin .......................... 340/248 C |
| 3,187,234 | 6/1965 | Muranaka et al. .............. 340/248 A |
| 3,243,658 | 3/1966 | Blackburn .......................... 317/31 |
| 3,268,823 | 8/1966 | MacMillan ............... 340/248 A UX |
| 3,431,557 | 3/1968 | Thomas et al. ............. 340/248 A X |
| 3,775,675 | 11/1973 | Freeze et al. .............. 340/253 A X |

Primary Examiner—John W. Caldwell
Assistant Examiner—Daniel Myer
Attorney, Agent, or Firm—Richard S. Sciascia; J. M. St. Amand; David O'Reilly

[57] ABSTRACT

A three-phase power disturbance monitor for sensing and recording anomalies occurring in electrical power systems which cause operational malfunctions in, and damage to, critical loads such as computers and synchronous communication equipment. The system senses and counts over and under voltage conditions, over and under frequency variations, and high or low threshold pulse transients. The monitor provides visual and audio warnings of power supply conditions which could damage equipment if left uncorrected for a period of time. The number of disturbances exceeding certain values is displayed on a digital counter. The monitor is equipped with a common input voltage section, a common 24 volt d.c. power supply and a front panel a.c. volt meter. Upper and lower threshold values for each condition are adjustable between certain limits determined from particular applications of the monitor. The audio and visual warning systems remain on if the disturbance continues to exceed a predetermined value for length of time. An external voltage feature has the capability of triggering a remote alarm system, powering down critical equipment and initiating the switching of critical loads to another power source.

20 Claims, 14 Drawing Figures

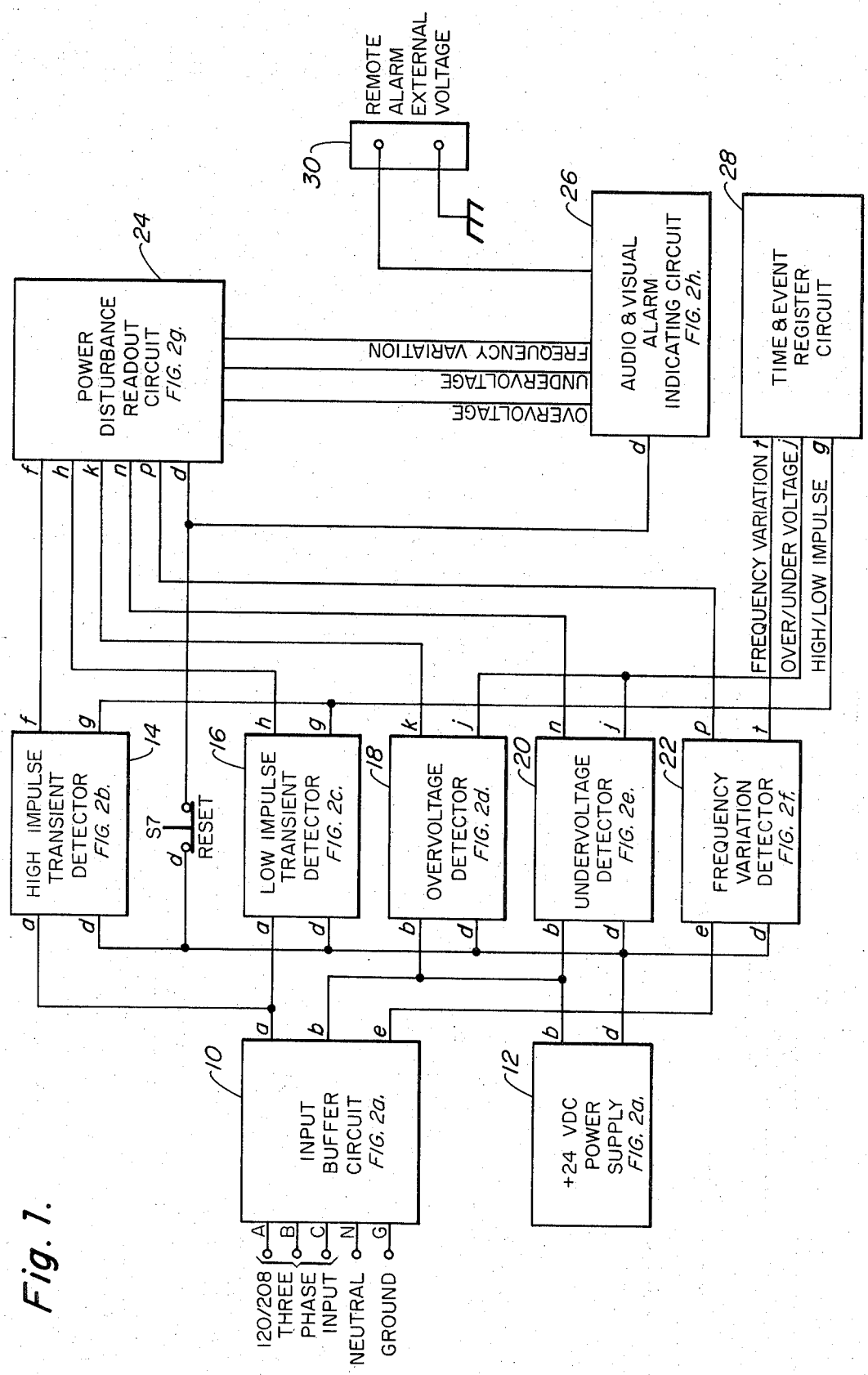

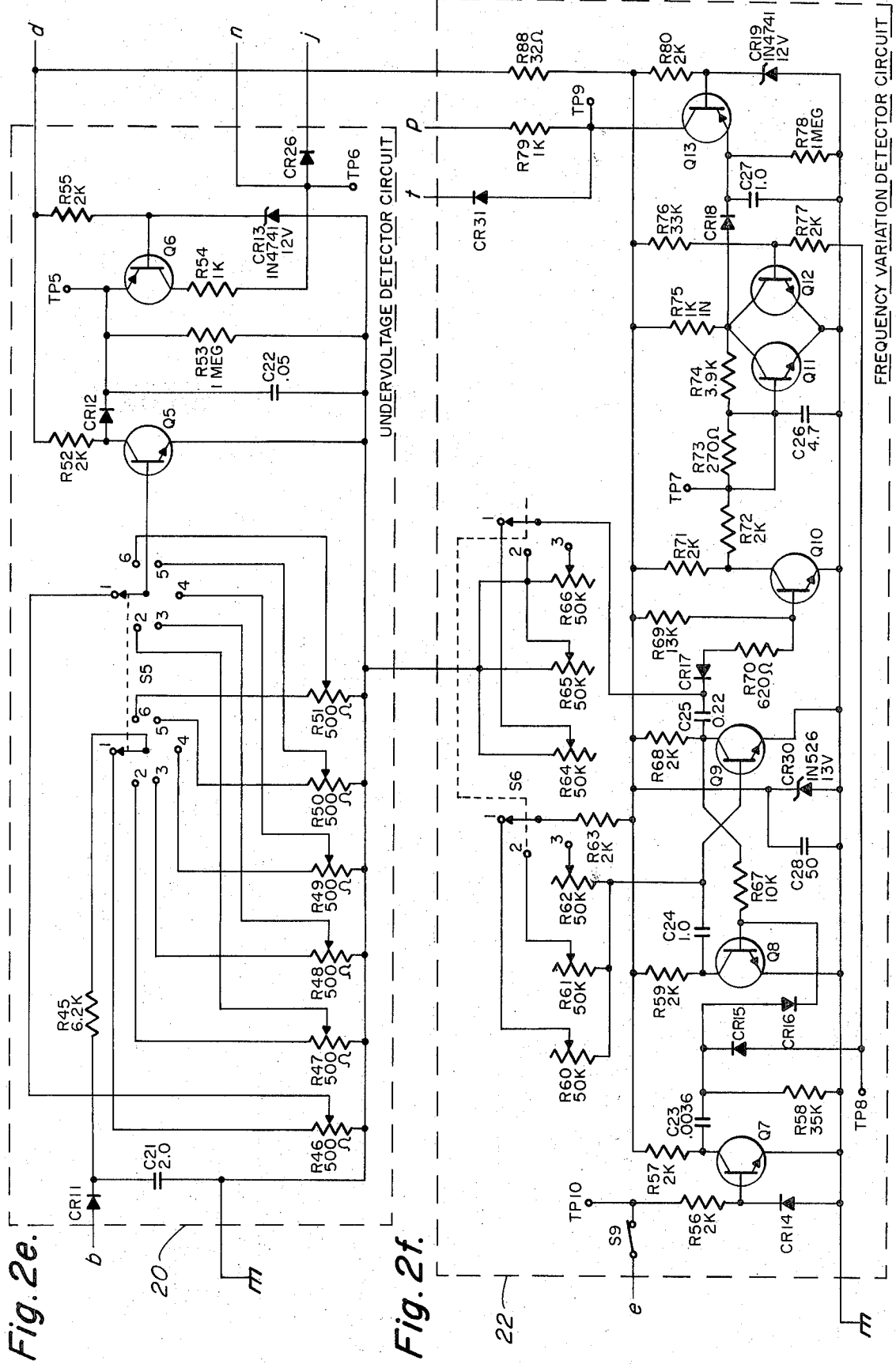

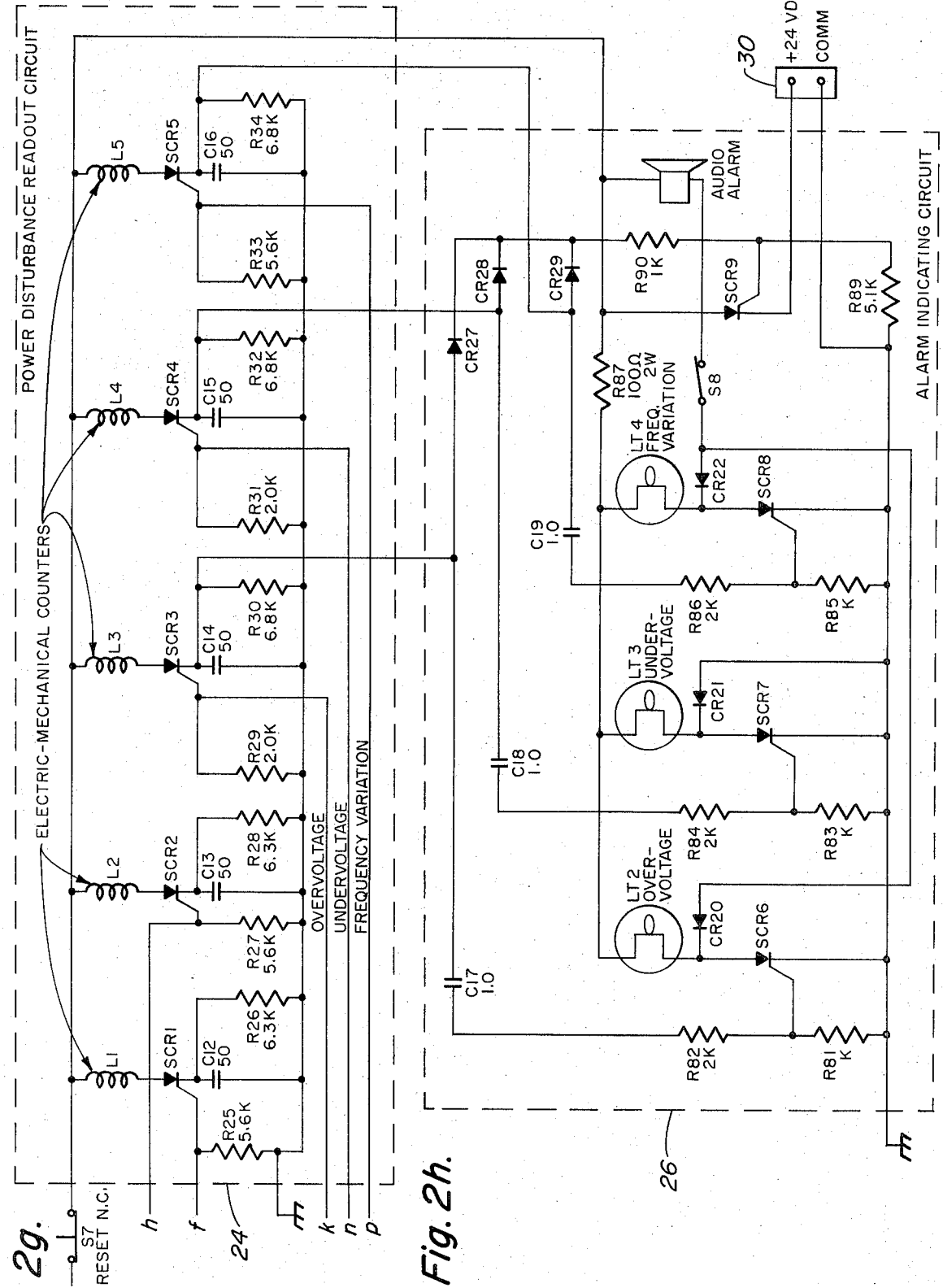

THREE-PHASE POWER DISTURBANCE MONITOR

BACKGROUND OF THE INVENTION

This invention relates to power disturbance monitors and more particularly relates to a three-phase power disturbance monitor.

At many installations, anomalies occurring in electrical power systems cause operational malfunctions in, and damage to, critical loads such as computers and synchronous communication equipment. A need, therefore, existed for an economical means of monitoring electrical power systems and categorizing the types of anomalies that occur on such systems.

Although numerous power line monitors are commercially available, most of them are designed to monitor a specific parameter. Low cost monitors are available in the form of strip chart recorders that record either voltage, current, or frequency. This type is capable of recording only one parameter at a time. Such types give very poor response and resolution resulting in questionable data. There are also very expensive and elaborate power line monitoring systems available but none were found that had more than a three parameter capability. The lack of a commercially available, suitable, economical power line monitor led to the development of the present invention described herein.

SUMMARY OF THE INVENTION

The purpose of the present invention is to provide a three-phase monitor which will sense, count, and record power disturbances and will give a visual and audio warning of the existence of such conditions for any period of time. The three-phase power disturbance monitor consists of an overvoltage sensor counter, undervoltage sensor counter, over-under frequency sensor counter, low threshold pulse transient sensor counter, high threshold pulse transient sensor counter, a common input voltage section, a common 24 volt d.c. power supply, visual warning lights, an audio alarm and an a.c. volt meter. The overvoltage thresholds are adjustable from 120 up to 140 volts r.m.s. and the undervoltage thresholds are adjustable from 115 down to 90 volts r.m.s. The over-under frequency thresholds are adjustable from 56.5 up to 63.5 Hertz. Pulse transient thresholds are adjustable from 50 up to 1,200 volts peak-to-peak. The input requirements for the monitor are 120/208 volts a.c., three-phase "wye" configuration, 50–60 Hertz. Power consumption is approximately 48 Watts.

In operation, the monitor is connected to a three-phase 120/208 volt "wye" source with the proper phase sequencing. The threshold level settings are adjusted to the levels desired for voltage, pulse transients and frequency. When the main power switch of the unit is on, all three phase voltages can be checked individually by switching a panel meter switch to observe the voltage indication on the built-in volt meter. A push-button reset switch can be used to turn off the visual warning lights and audio alarm if they are triggered by the initial surge when power is turned on. This is done by momentarily pressing the reset button which will turn off the visual warning lights and audio sound if all three-phase voltages and frequencies do not exceed any of the preset threshold level settings. Electromechanical counters, associated with each detection circuit, will count each time a power disturbance exceeds the threshold setting of that circuit. In addition to counting the power disturbances, the unit will provide a visual and an audio alarm if the power disturbance exceeds the preset threshold level for a predetermined length of time. The monitor also can include an external voltage terminal which can be used to provide remote warning of any power disturbance and a time and event register section. The time and event register includes a time-of-day clock and associated electronics which record the exact time and type of disturbance for correlation with operational malfunctions of equipment being driven by the power input.

OBJECTS OF THE INVENTION

It is an object of the present invention to provide a power disturbance monitor for verifying the quality of power supplied to critical electrical equipment subject to operational failures and damage.

Another object of the present invention is to provide a power disturbance monitor which can simultaneously monitor several electrical parameters.

Yet another object of the present invention is to provide a power disturbance monitor which will simultaneously detect and indicate overvoltage, undervoltage, high pulse transient and low pulse transient conditions and frequency.

A further object of the present invention is to provide a power disturbance monitor which will count the number of disturbances of each type.

A still further object of the present invention is to provide a power disturbance monitor which will give a visual and audio warning of power disturbances which can damage critical equipment if left uncorrected for a period of time.

Yet another object of the present invention is to provide a power disturbance monitor which provides an external voltage feature for a remote alarm, powering down critical equipment or initiating the switching of critical equipment to an alternate power source.

Other objects, advantages and novel features of the invention will become apparent from the following detailed description of the invention when considered in conjunction with the accompanying drawings.

BRIEF DESCRIPTION OF THE DRAWINGS

FIG. 1 is a block diagram illustrating the interconnection of the three-phase power disturbance monitor.

FIGS. 2a through 2h are schematic diagrams of the individual circuits of the block diagram of FIG. 1 with the interconnections of the circuits indicated by lower case letters.

DETAILED DESCRIPTION OF THE PREFERRED EMBODIMENT

Figure 2A:
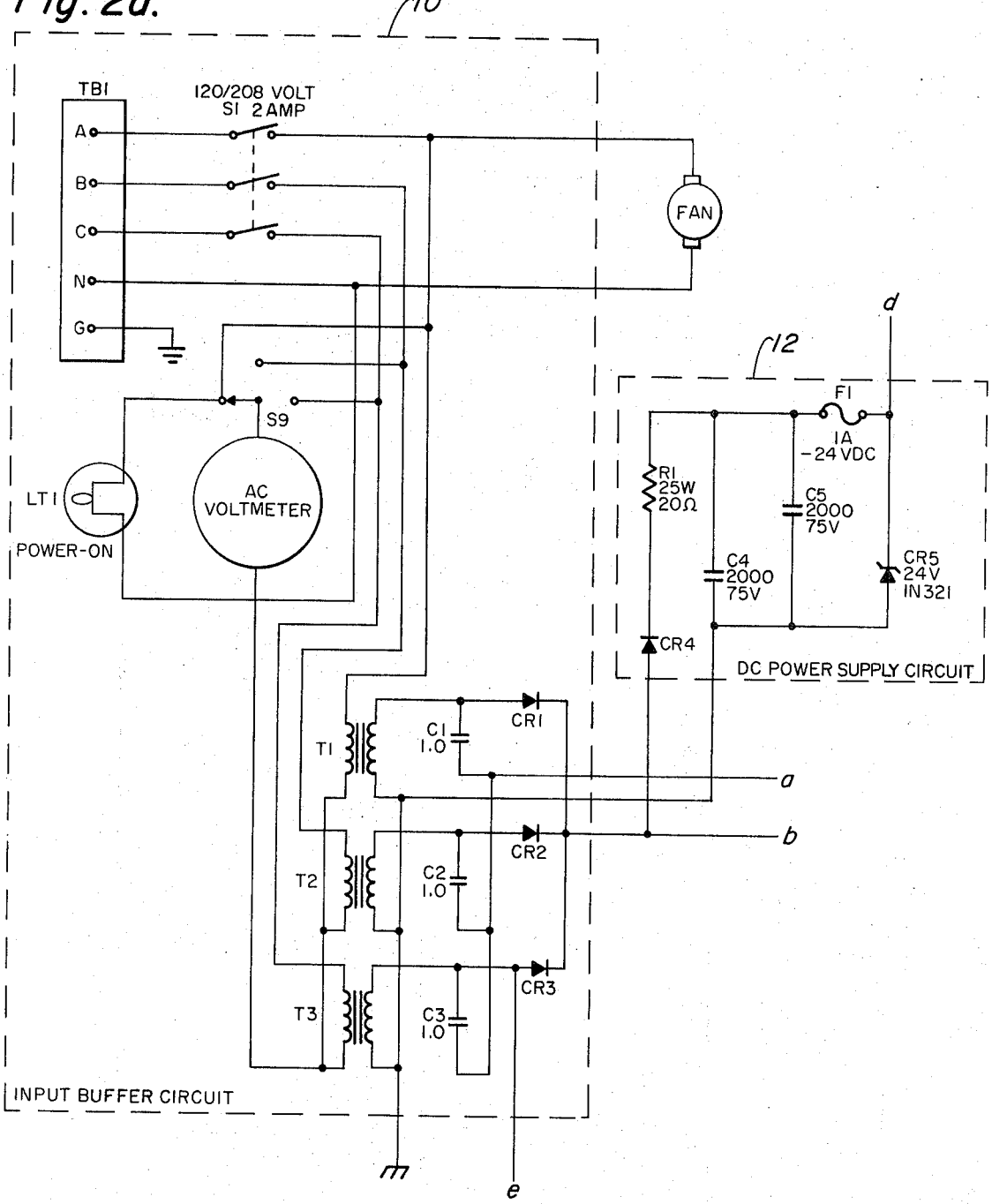

The purpose of the invention described herein is to provide a three-phase power disturbance monitor which will simultaneously monitor voltage or frequency variations and pulse transients of either positive or negative polarity on all phases of a 120/208 volt, three-phase, 50–60 Hertz power distribution circuit.

The interconnection of the various circuits of the three-phase power disturbance monitor are shown in the block diagram of FIG. 1. The three-phase 120/208 volt, 50–60 Hertz power distribution circuit to be monitored is connected to the inputs of an input buffer circuit 10. The input buffer 10 provides a three-phase rectified voltage to the overvoltage and under-voltage detection circuits 18, 20 respectively. The input buffer section 10 also provides a three-phase output through coupling capacitors to the high and low impulse voltage detectors 14, 16 respectively. The output of the input buffer section 10 supplied to the overvoltage and undervoltage circuits is also supplied to the d.c. power supply 12 which provides a 24 volt d.c. regulated output to power the monitor. The frequency variation detection circuit 22 is connected to only one phase of the input buffer circuit 10.

Pulse transients detected by the high and low impulse detection circuits 14, 16 are fed to the power disturbance readout circuit 24 and the time and event register 28. The power disturbance readout section 24 counts the number of transients while the time and event register 28 records the time and the type of disturbance detected. Voltage fluctuations which exceed the thresholds set in the overvoltage and undervoltage detection circuits 18, 20 are also fed to the power disturbance readout circuit 24 and the time and event register 28. The power disturbance readout circuit 24 and the time and event register 28 also receive the output from the frequency variation detection circuit 22. Voltage fluctuations and frequency variations are fed from the power disturbance readout circuit 24 to the alarm indicating circuit 26, which provides visual and audio alarms, if these conditions exist beyond a certain length of time. An output from the alarm indicating circuit 26 also goes to external jacks 30 in order to provide a remote audio alarm, if desired.

The 120/208 volts primary power to be monitored is connected to the input buffer circuit 10 through terminal board TB1 shown in FIG. 2a. The terminal board TB1 has five terminals A, B, and C for the three phases, N for neutral, and GRD for ground. The primary power supplied to terminal board, TB1 is connected to switch S1 which is a three-phase, 2 amp switch breaker. The main power-on indicating light LT1 is connected to phase A after switch S1. The input buffer circuit 10 is also provided with a front panel mounted (FIG. 3) 0–150 volt a.c. meter which can be switched to any of the three phases to measure the input line voltage. The input power from switch S1 is connected to the primaries (120 volt r.m.s.) of three transformers, T1, T2, and T3, wired for a three-phase "wye" configuration.

The secondary power output from transformers T1, T2 and T3 is 30 volts r.m.s. This voltage is rectified by diodes CR1, CR2 and CR3, and is the voltage that is monitored for overvoltage and undervoltage conditions.

This rectified voltage is also fed to the d.c. power supply 12 which consists of isolation diode CR4, current limiting resistor R1, filter capacitors C4 and C5, one amp fuse F1 and voltage regulating (24 volt d.c.) zener diode CR5. The output from the power supply is 24 volts d.c. regulated and is used to power the monitor.

Figure 2B:
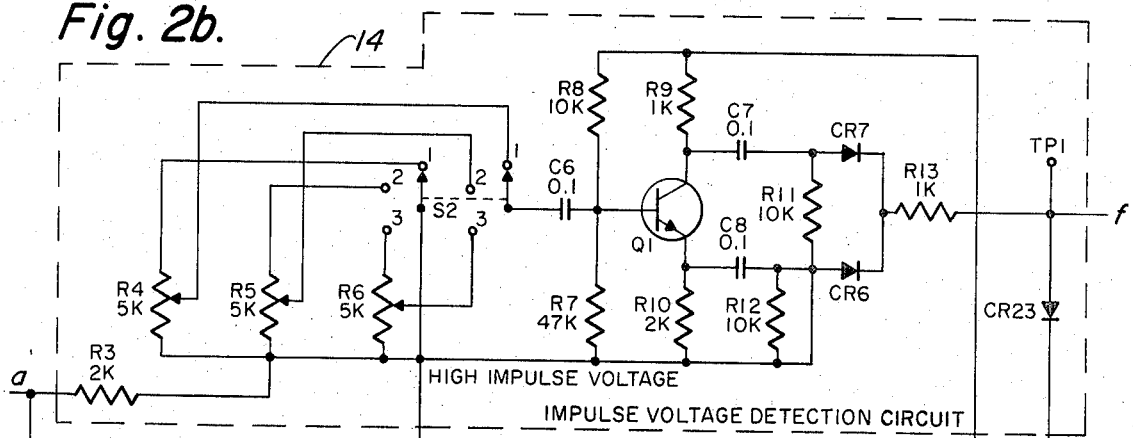
Figure 2C:
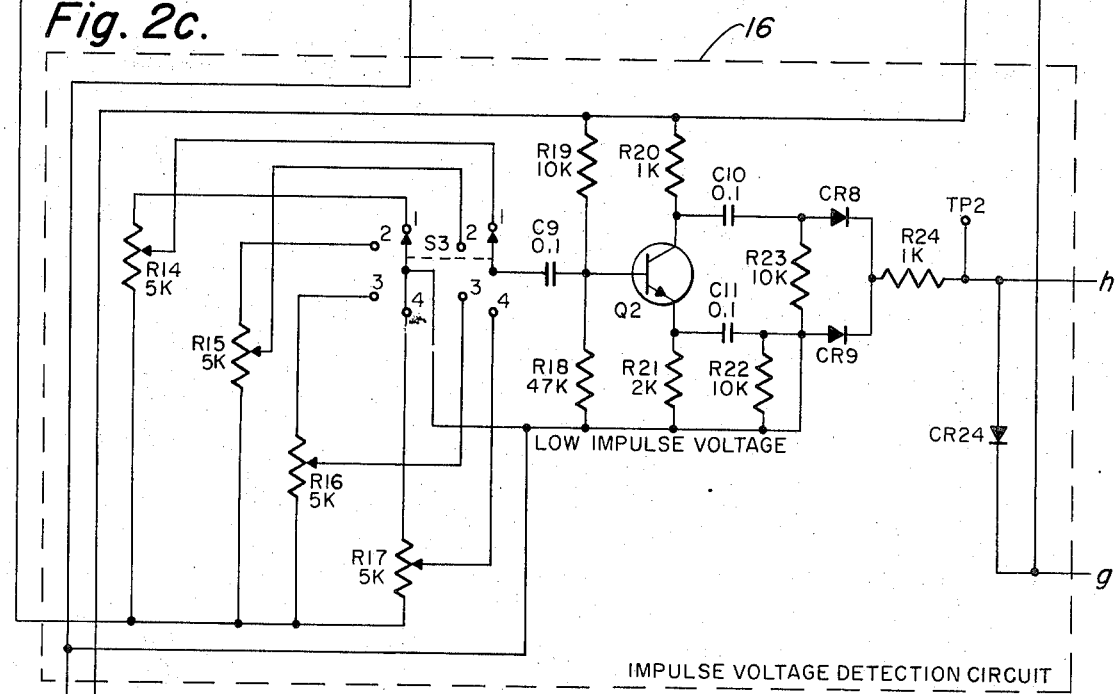
Figure 2D:
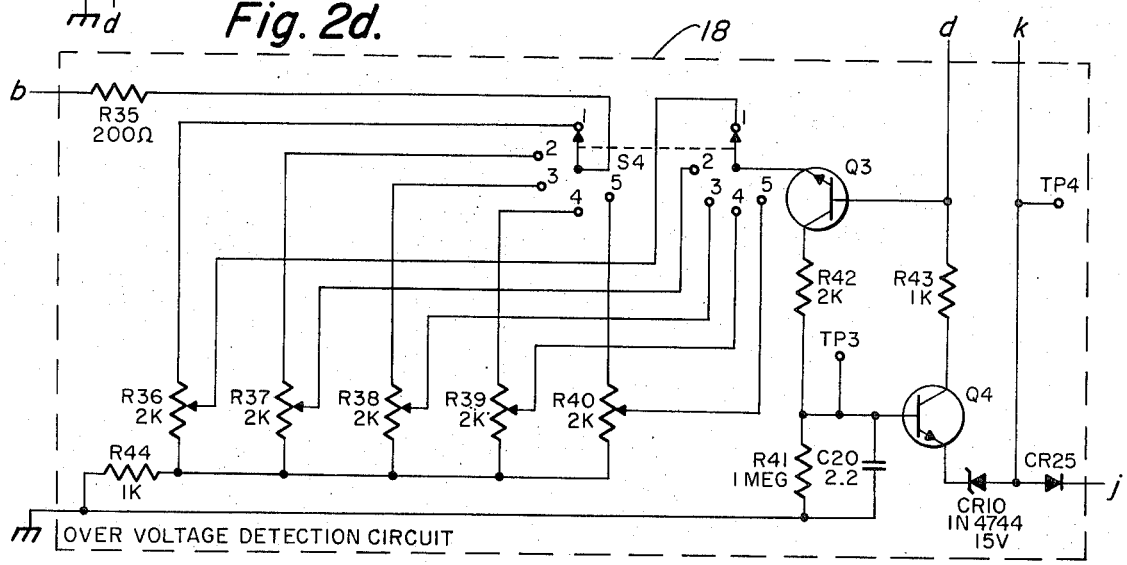

The overvoltage detection circuit 18, shown in FIG. 2d, is a preset threshold sensor. The preset threshold levels of 120, 125, 130, 135 and 140 volts r.m.s. can be switched in by switch S4 as desired. When a preset threshold level is reached or exceeded simultaneously on all the phases, or on any one phase being monitored, the associated counter in the power disturbance readout circuit 24 will count once, the associated warning light in the alarm indicating circuit 26 will light, and the audio alarm will sound. If the voltage stays at, or continues to exceed the preset threshold level setting, the warning light cannot be extinguished, but the audio alarm may be turned off by switch S8 in the alarm indicating circuit.

Figure 4:
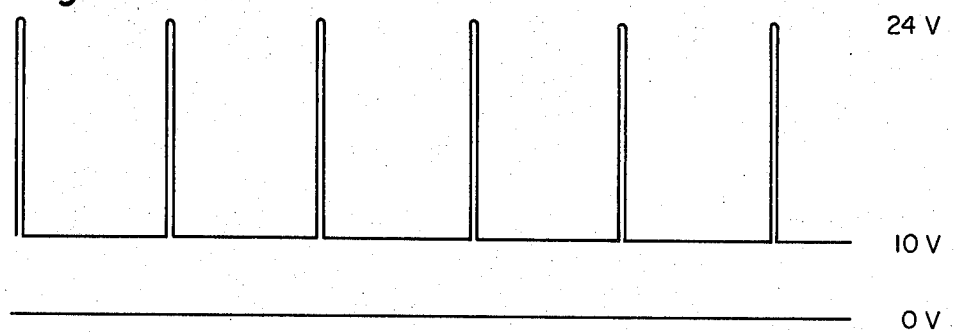
FIG. 4 is a diagram of the waveshape when a pulse transient is detected at TP-1 or TP-2.

An input attenuator network, consisting of potentiometers R36 thru R40 and resistor R44 receives the rectified voltage from the input buffer circuit 10 and is used to preset the threshold levels of the overvoltage sensor. Transistor Q3 is normally in a cut-off state. An increase in line voltage causes the rectified voltage at the emitter of transistor Q3 to increase. When this voltage exceeds the voltage at the base of the transistor Q3, it starts to conduct. As transistor Q3 conducts, capacitor C20, which is connected to the base of transistor Q4, starts to charge positively. If the rectified line voltage continues to increase, this increases the conduction of transistor Q3 and charges capacitor C20 to a more positive voltage. Capacitor C20 functions as a filter to prevent short duration positive pulses from causing overvoltage counter to count. When this voltage exceeds 15 volts (the breakdown voltage of diode CR10), transistor Q4, which is normally off, starts to conduct. FIG. 4 illustrates the voltage waveshapes at test point TP-4 with the threshold level setting exceeded.

This conduction causes a positive voltage on the gate of silicon controlled rectifier SCR3, causing it to turn on, allowing capacitor C14 to rapidly charge. As the charging current passes through the coil L3 of the overvoltage electro-mechanical counter, it advances one count. Simultaneously, as capacitor C14 charges, capacitor C17 also charges, putting a positive voltage on the gate of silicon controlled rectifier SCR6, which turns it on. This grounds one side of the overvoltage warning light and the audio alarm, turning them on. If the line voltage remains above the preset threshold level settings, transistors Q3 and Q4 will continue conducting, keeping a positive voltage on the gate of silicon controlled rectifier SCR3, keeping it turned on.

If the reset button S7 is depressed, the warning light will turn off and the audio sound will stop, but when the reset button is released, the warning light will light and the sound will continue. The audio alarm can be turned off by switch S8 but the warning light will remain lighted as long as the line voltage remains above the preset threshold setting. When the line voltage drops below the preset threshold level setting, transistors Q3 and Q4 stop conducting; this removes the positive voltage from the gate of silicon controlled rectifier SCR3. With the gate no longer positive and capacitor C14 fully charged, silicon controlled rectifier SCR3 turns off. Then capacitor C14 discharges through resistor R30, resetting it for the next count. Now the warning light may be extinguished by depressing the reset button S7.

The undervoltage detection circuit 20 is also a preset threshold sensor and can be switched in as desired at preset threshold levels of 115, 110, 105, 100, 95 and 90 volts r.m.s. A voltage which exceeds the preset threshold level will produce the same result as the overvoltage detection circuit 18. That is, the associated counter will count once, the associated warning light will be illuminated and the audio alarm will sound. A continuous voltage which exceeds the threshold level will prevent the warning light from being extinguished, but the audio alarm may be turned off by switch S8.

Figure 5:
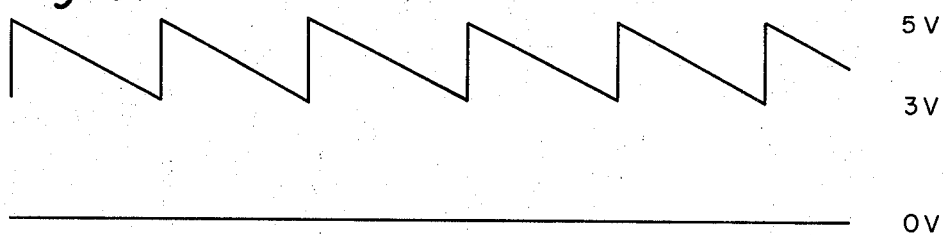
FIG. 5 is a diagram of the waveshape at TP-4 with the preset threshold exceeded in the overvoltage detection circuit.

The three-phase rectified line voltage from the input buffer circuit 10 is also supplied to the input of the undervoltage detection circuit 20. This input is fed through isolation diode CR11 and is partially filtered by capacitor C21. The undervoltage detection circuit 20 also has an input attenuation network consisting of potentiometers R46 through R51 used to preset the threshold levels of the detection circuit. Transistor Q5 is normally biased to almost full conduction by the voltage from the input attenuator that is applied to its base. When the line voltage decreases, the voltage on the base of transistor Q5 decreases. This decreases conduction through transistor Q5, causing the collector voltage to increase. As the collector voltage increases, the charge on capacitor C22, which is attached to the emitter of transistor Q6, increases. Capacitor C22 functions as a filter so that short duration negative transients cannot cause the undervoltage counter to count. When this charge exceeds 5.6 volts, transistor Q6 starts to conduct. As the line voltage reaches or exceeds the threshold level setting, transistor Q6 conducts, putting a positive voltage on the gate of silicon controlled rectifier SCR4, thus turning it on. The operation and circuitry of the counting and warning circuits used with the undervoltage circuit are identical with the circuit described in conjunction with the overvoltage circuit above. FIG. 5 illustrates the voltage waveshape at test point TP5 with the threshold setting exceeded.

The frequency variation detector circuit 22, an over-under frequency sensor, also of a preset threshold type, has preset levels of 59–61, 58–62, and 57–63 Hertz that can be switched in as desired. If the preset threshold level is reached or exceeded, the associated counter will count once, the associated warning light will light and the audio alarm will sound. If the frequency stays at or continues to exceed the threshold setting, the warning light cannot be extinguished but the audio alarm may be turned off.

Figure 6:
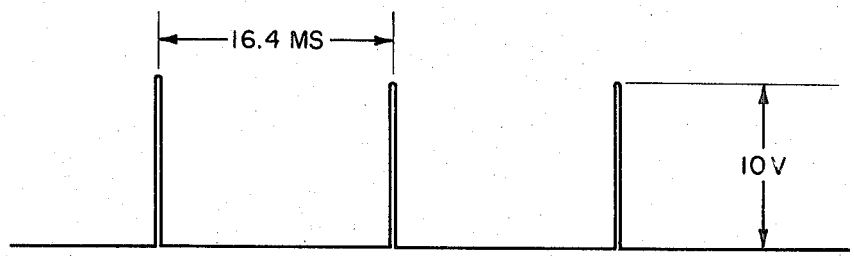
FIG. 6 is a diagram of the waveshape at TP5 with the preset threshold on the undervoltage detection circuit exceeded.

The input to the over-under frequency detector 22 is from the secondary of transformer T3 of the input buffer circuit 10. Resistor R56 and diode CR14 are used as the input attenuators. The output of transistor Q7 is a positive 18 volt squarewave which is differentiated by capacitor C23 and resistor R58. This produces a positive going pulse on the differentiated waveshape which goes to the base of transistor Q8 through diode CR16 and a negative going pulse which goes to the base of transistor Q12 through diode CR15 and resistor R77. Transistors Q8, Q9 and associated circuitry are a multi-vibrator that is triggered by the positive pulse at the base of transistor Q8. The output of the multi-vibrator is a positive squarewave. The on time of this multi-vibrator is controlled by the settings of potentiometers R60 through R62. This on time setting is the over frequency threshold level setting. The output squarewave of the multi-vibrator is differentiated by capacitor C25 and potentiometers R64 through R66. The negative pulse is coupled to the base of transistor Q10 through diode CR17 and resistor R70. Transistor Q10 inverts and amplifies this pulse which results in a positive squarewave on the collector. The width of this squarewave is controlled by the setting of potentiometers R64 through R66. This is the under frequency threshold setting. This positive squarewave is coupled through the base of transistor Q11 through resistor R72. Transistors Q11 and Q12 have a common connection for their collectors and a common connection for their emitters. Both transistors Q11 and Q12 are biased to almost full saturation. This drives a common collector voltage to approximately zero. Simultaneously, transistor Q11 has a positive squarewave on its base and transistor Q12 has a negative pulse on its base. As long as the positive squarewave and negative pulse are in coincidence, no signal will appear on the common collector point of transistor Q11 and Q12, thus indicating the frequency has not exceeded the preset threshold level. When the threshold level setting is reached or exceeded, a 14 volt positive pulse will appear on the common collector point of transistor Q11 and Q12. These pulses are coupled through diode CR18, causing capacitor C27, which is connected to the emitter of transistor Q13, to charge in a positive direction. When this charge on capacitor C27 reaches 12 volts, transistor Q13 starts to conduct. Transistor Q13 is normally held in a cut-off state by the positive 12 volts maintained on the base by zener diode CR19. As transistor Q13 conducts, this puts a positive voltage on the gate of silicon controlled rectifier SCR5, turning it on. The counting and warning circuits 24, 26 respond to over-under frequencies in the same manner as for overvoltages described above. FIG. 6 shows the waveshape at test point TP9 when the over-under frequency threshold level setting has been exceeded.

The high and low impulse transient detector circuits 14, 16 are also of the preset threshold type. The high impulse detector has preset threshold level settings of 300, 450 and 600 volts peak-to-peak while the low impulse detector has preset threshold level settings of 50, 100, 150 and 200 volts peak-to-peak. Both high and low impulse detection circuits will sense transients of positive or negative polarity with durations of approximately 1 microsecond to 16 milliseconds. The electronic circuitry of each is substantially identical. If a pulse transient occurring on any one of the three phases being monitored reaches or exceeds the threshold level setting, the associated counter will count once. No warning light or audio alarm is used with the pulse transient detectors.

Figure 7:
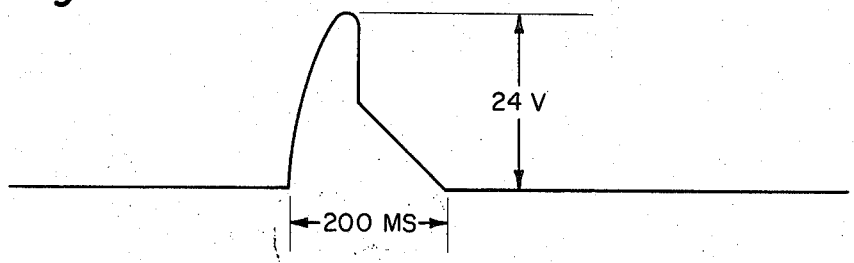
FIG. 7 is a diagram of the waveshape at TP9 when the frequency threshold of the frequency variation circuit is exceeded.

The input to the pulse detection circuits is through coupling capacitors C1, C2, C3 and a resistor attenuator network consisting of potentiometers R4 through R6 for the high impulse detector 14 and R14 to R17 for the low impulse detector 16. The potentiometers are used to set the threshold level for each of the respective detector circuits. The pulse signals are coupled through capacitor C6 for the high impulse detector 14 or capacitor C9 for the low impulse detector 16 to the base of transistor Q1 or transistor Q2 respectively. Capacitors C1, C2, C3, along with the potentiometer of the resistor attenuator network being used in conjunction with capacitor C6 and capacitor C9 of the high and low impulse detectors respectively, also filter the voltage sign wave to almost a zero potential. Transistors Q1 and Q2 are biased class "A," so they will conduct with positive or negative pulse transients. Transistors Q1 and Q2 with the associated components function as a phase splitter network so that any transient that is detected will appear as a positive pulse at test point TP1 or TP2. This pulse will also appear on the gate of the silicon controlled rectifiers SCR1 or SCR2, turning it on and causing the associated counter to advance once. The counting circuits operate as described with respect to the overvoltage circuit above. FIG. 7 shows the waveshape that will appear at test points TP1 or TP2 when a transient that exceeds the threshold level is detected.

The power disturbance readout circuit 24 of FIG. 2g receives the output from the five detection circuits. Coils L1 through L5 are the coils of the electro-mechanical counters shown mounted in the front panel of FIG. 3. The circuitry associated with each counter shown in FIG. 2g is substantially the same, only differing in component values and having a response time between counts of approximately 300 milliseconds. The counters and associated circuits all operate in the same manner described with respect to the overvoltage detection circuit of FIG. 2d above.

Figure 3:
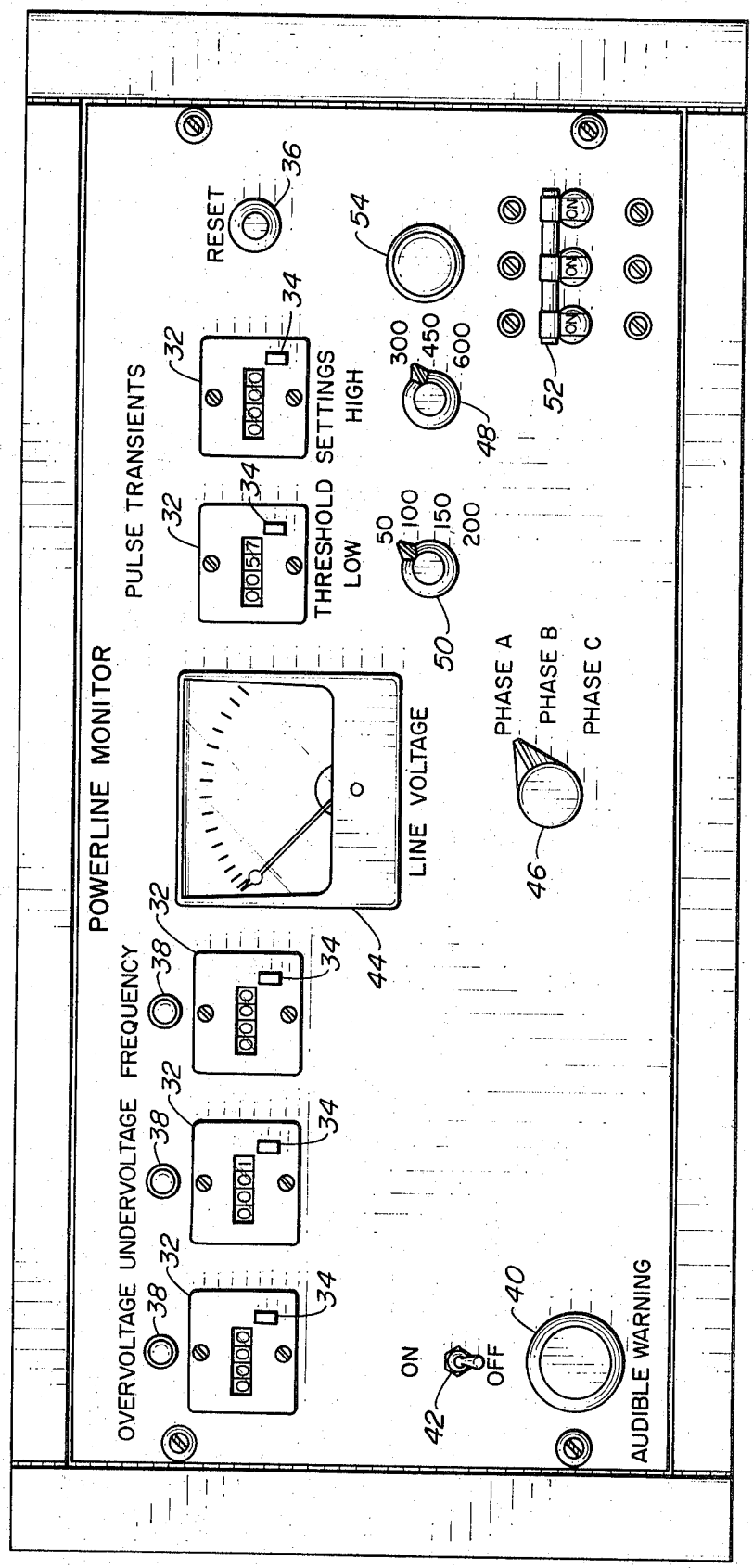
FIG. 3 is a front panel view of one embodiment of the power disturbance monitor showing the arrangement of components.

The electro-mechanical counters 32, shown in the front panel view of FIG. 3, are four digit units with zero reset by pushbuttons 34. Also, on the front panel is reset switch 36 (S7 in FIG. 1) which extinguishes the visual warning lights 38 associated with the overvoltage, undervoltage, and frequency variation counters, if the condition which turns on the lights is not still present. The audio alarm device 40 is a SONALERT model SG-628 with a continuous 2,500 Hertz signal and has a separate on-off switch 42 (S8 in FIG. 2h) mounted on the front panel. The front panel mounted 0-150 volt a.c. meter 44 can measure the input line voltage of any one of the phases through a switch 46 (S9 in FIG. 2a) on the front panel. Switches 48, 50 (S2, S3 of FIGS. 2b and 2c), for selecting the threshold levels of the high and low pulse transient detection circuits respectively, are also provided on the front panel as is a power on switch 52 (S1 in FIG. 2a) and associated indicating light 54. In the preferred embodiment, the threshold level setting switches of the overvoltage, undervoltage and frequency variation detection circuits are provided on the rear panel adjacent to the connection for input power but could be mounted on the front panel, if desired.

The time and event register circuit 28, shown in FIG. 1, is not required but is an optional feature which may be incorporated in the monitor. To correlate power disturbances with equipment operational failure and physical damage, it is necessary to know the time and type of disturbance which occurred. Time can be separated into month, day, hour, minute and even seconds, if that accuracy is necessary. There are readily available binary coded digital (BCD) time clocks which would serve this purpose. It is anticipated that the clock would be mounted on the front panel (FIG. 3) with the time of day visually displayed. The type of disturbance can be recorded with the time, thus providing correlation with equipment malfunctions. A printer, such as one in conjunction with the time clock, will readily provide this function. A suitable printer for this purpose is manufactured by HECON. The outputs from the five detection circuits are fed to the time clock of the time and event register 28, which provides a coded signal to the HECON printer. The HECON printer can be programmed to provide the time and the event which occurred by printing a 1 for frequency variations, a 2 for an overvoltage condition, a 3 for an undervoltage condition, a 4 for a low pulse transient and a 5 for a high pulse transient. With this information, equipment malfunctions can be correlated with the time and type of power disturbance which occurred.

Another feature of the power disturbance monitor is the provision of an external alarm voltage terminal 30 of FIG. 1. Externally accessible terminals connected to the audio alarm portion of the alarm indicating circuit 26 provide the user with the capability of triggering a remote alarm system, powering down critical equipment and initiating the switching of critical loads to another power source.

The component values of the circuits illustrated in FIGS. 2a through 2h are given merely by way of example of a workable design. All capacitors are in microfarads and are 35 VDC minimum unless otherwise specified. The transistors are 2N697 for the NPN's and 2N404 for the PNP's. Silicon controlled rectifiers SCR1 – SCR8 are C6F's, while all diodes not specified are 1N2069's.

Thus, there has been disclosed a power line disturbance monitor which continuously monitors power input to critical equipment and gives visual and audio indications if fluctuations in power input occur and can record the time of the disturbance, if desired. A number of alternative features to the invention could be provided, if desired. For example, the system could be provided with a multiple voltage power input connector. In this case, a primary input multiple voltage connector, such as an attenuator network or multi-tap transformer, would enable the monitor to be used on the primary side of substations with voltages of 4,160 and even greater. Another alternative would be to provide an over-under frequency register which would give the capability of determining whether an increase or decrease from the base frequency is a cause of equipment operational failure or damage. The equipment could also include single to three-phase switching, in which an internal switching section would allow the three-phase monitor to be utilized as a single phase monitor, which would greatly improve the versatility of the unit. Obviously, many modifications and variations of the present invention are possible in light of the above teachings. It is therefore to be understood that within the scope of the appended claims, the invention may be practiced otherwise than as specifically described.

I claim:

1. A power disturbance monitor for detecting and indicating anomalies occurring in a source of electrical power comprising:
    an input buffer circuit for measuring the power input and supplying rectified and filtered voltages to disturbance detection circuits;
    a d.c. power supply connected to the rectified output of the input buffer for supplying power to the disturbance detection circuits;
    means for connecting the power source to the input buffer circuit;

an overvoltage detection circuit receiving a rectified voltage from the input buffer for sensing voltage above a preset threshold;

an undervoltage detection circuit receiving a rectified voltage from the input buffer for sensing voltages below a preset threshold;

a frequency variation detection circuit connected to the input buffer for sensing frequency variations above and below preset thresholds;

a high pulse transient detection circuit receiving a filtered voltage from the input buffer for sensing pulse transients above a preset threshold level;

a low pulse transient detection circuit receiving a filtered voltage from the input buffer for sensing pulse transients below a preset threshold level;

a power disturbance readout circuit receiving the outputs of the power disturbance detection circuits for counting the number of each type of disturbance; and an alarm indicating circuit receiving overvoltage, undervoltage, and frequency variation outputs from the power disturbance readout circuit for giving visual and audio alarms when a disturbance is detected by one or more of the circuits.

2. The power disturbance monitor of claim 1 wherein the input buffer includes:

means for connecting a three-phase power source to be monitored;

an a.c. voltmeter for measuring the input line voltage;

switching means for selecting any one of the three phases to be measured;

three transformers for isolating the detection circuits for the input power source, each transformer having one phase of the power source connected to its primary side; and a capacitor and diode connected to the secondary of each transformer for providing a filtered and rectified output to the disturbance detection circuits.

3. The power disturbance monitor of claim 1 wherein the overvoltage and undervoltage detection circuits include:

an adjustable input attenuator;

a switch for selecting the threshold at which a voltage disturbance will be detected; and a transistor switching and charging circuit adapted to provide an output by conducting at a predetermined voltage.

4. The power disturbance monitor of claim 3 wherein the threshold selector switch for the overvoltage is adapted to provide threshold selections of 120, 125, 130, 135 and 140 volts.

5. The power disturbance monitor of claim 3 wherein the threshold selector switch of the undervoltage detection circuit is adapted to provide threshold selections of 115, 110, 105, 100, 95 and 90 volts.

6. The power disturbance monitor of claim 1 wherein the frequency variation detection circuit includes:

an input attenuator;

means for differentiating the input;

a multi-vibrator for producing a squarewave connected to the output of the differentiating means;

means for selecting over frequency threshold level by adjusting the on time of the multi-vibrator;

means for selecting the under frequency threshold level by differentiating the output of the multi-vibrator;

means for inverting and amplifying the output of the under frequency threshold selecting means; and means for comparing the output of the inverting means with a negative pulse from the differentiating means to prevent an output when the two signals are in coincidence; and a transistor switching and charging circuit adapted to provide an output by conducting at a predetermined voltage.

7. The power disturbance monitor of claim 6 wherein the over frequency threshold level selecting means is comprised of:

a plurality of potentiometers for adjusting the on time of the multi-vibrator; and a switch for selecting any one of the potentiometers thereby setting a particular threshold level for over frequency detection.

8. The power disturbance monitor of claim 7 wherein the means for selecting the under frequency threshold level is comprised of:

a capacitor;

a plurality of potentiometers;

a switch for selectively connecting any one of the potentiometers in series with the capacitor thereby setting the particular threshold level for under frequency detection.

9. The power disturbance monitor of claim 8 wherein the switch for setting the over frequency threshold level and under frequency threshold level are connected to simultaneously select the over frequency and under frequency settings.

10. The power disturbance monitor of claim 9 wherein the frequency variation circuit is adapted to select frequency ranges of 59–61, 58–62 or 57–63 Hertz.

11. The power disturbance monitor of claim 10 wherein the coincidence comparing means is comprised of:

two transistors having a common connection for their collectors and a common collection for their emitters.

12. The power disturbance monitor of claim 1 wherein the high and low pulse transient detection circuits are comprised of:

an adjustable input attenuator network;

a switch for selecting the threshold level at which a pulse transient will be detected; and a phase splitter network for providing a positive pulse whenever a pulse transient occurs.

13. The power disturbance monitor of claim 12 wherein the high pulse transient detection circuit is adapted to provide threshold level settings of 300, 450 and 600 volts peak-to-peak.

14. The power disturbance monitor of claim 12 wherein the low pulse transient detection circuit is adapted to provide threshold level settings of 50, 100, 150 and 200 volts peak-to-peak.

15. The power disturbance monitor of claim 1 wherein the power disturbance readout circuit is comprised of:

a separate electro-mechanical counter associated with each power disturbance detection circuit respectively; and a switching circuit associated with each counter and adapted to be energized by a power disturbance from the detection circuit with which it is associated, thereby causing the counter to advance one count.

16. The power disturbance monitor of claim 1 wherein the alarm indicating circuit is comprised of:
- a separate indicating light associated with each of the overvoltage, undervoltage, and frequency variation detection circuits respectively;
- a switching circuit associated with each light and adapted to be energized by a power disturbance from the detection circuit with which it is associated; and
- a speaker adapted to be energized by any one of the switching circuits.

17. The power disturbance monitor of claim 16 further including:
a switch in the alarm indicating circuit for de-energizing the speaker.

18. The power disturbance monitor of claim 17 further including:
external terminals connected to the speaker for providing a remote alarm.

19. The power disturbance monitor of claim 1 further including:
a time and event register for recording the time and indicating the particular type of power disturbance which occurred.

20. The power disturbance monitor of claim 19 wherein the time and event register is comprised of:
a binary coded time clock; and
a printer connected to the output of the binary coded time clock.

* * * * *